Jan. 12, 1926. Re. 16,246

J. W. CULP

GAME DEVICE

Original Filed August 6, 1923

INVENTOR.
J. W. Culp.
BY J. Edward Maybee.
ATTY.

Reissued Jan. 12, 1926.

Re. 16,246

UNITED STATES PATENT OFFICE.

JOHN W. CULP, OF JOHNSTOWN, PENNSYLVANIA.

GAME DEVICE.

Original No. 1,500,110, dated July 8, 1924, Serial No. 655,907, filed August 6, 1923. Application for reissue filed October 6, 1924. Serial No. 742,056.

*To all whom it may concern:*

Be it known that I, JOHN W. CULP, a citizen of the United States, residing at Johnstown, in the county of Cambria and State of Pennsylvania, have invented certain new and useful Improvements in Game Devices, of which the following is a specification.

In carrying out the present invention it is my purpose to provide a chance device wherein the well known game of dice may be played in such a manner as to relieve this game of any personal skill on the part of the players thereof, the device being entirely a game of chance.

A still further purpose of this invention is the provision of such a chance device that is extremely simple and durable of construction, and one that may be manufactured and marketed at a relatively small cost, the device comprising relatively few parts being co-related in such a manner as to reduce the possibility of disarrangement to a minimum.

With the above and other objects in view, as the nature of the invention is better understood, the same comprises the novel form, combination and arrangement of parts shown in the accompanying drawings and set forth in the following specification and claims.

Figure 1:
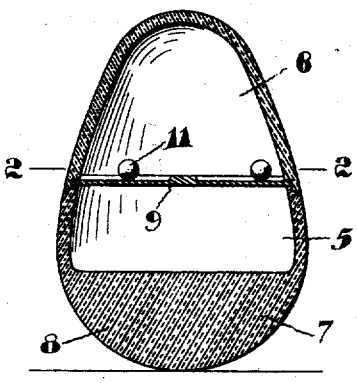
Figure 2:
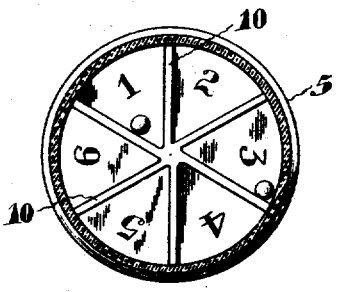
Figure 3:
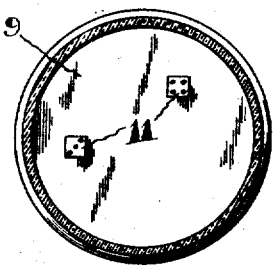

In the drawing, wherein like reference characters designate corresponding parts throughout Figures 1 and 2, and wherein, Figure 1 is a vertical cross section of my novel chance device;

Figure 2 a longitudinal section, taken substantially on the line 2—2 of Figure 1, and Figure 3 is a view similar to Figure 2 of a slightly modified form of the present invention.

First, having particular reference to Figures 1 and 2, my novel chance device embodies a hollow substantially egg shaped element 5 that includes a pair of sections 6 and 7 respectively, the meeting edges are rabbeted as more clearly shown in Figure 1 and are secured through the medium of water glass or transparent cement.

The sections of this egg shaped member are of transparent glass, celluloid, or other suitable material, the lowermost section 7 being weighted at its bottom end as at 8 whereby the device will normally assume an upright position as shown in Figure 1.

Secured in position between the sections 6 and 7 is a disc 9 of metal or any other suitable material, the top surface thereof being formed with ribs 10 that radiate from the central portion of said disc for thereby dividing this disc into V-shaped rest places. As is shown in Figure 2, there are six of these ribs and the spaces therebetween are numbered from one to six respectively.

The chance device also comprises a pair of balls 11 that rest upon said disc 9, it being of course at once apparent that when this chance device is tilted and released, the same will wobble back and forwards, the balls 11 rolling upon said disc 9 and immediately upon the device assuming an upright position, the balls 11 will naturally come to rest within certain of the spaces provided by the ribs 10, and the total of the numbers upon the spaces occupied by said balls will be the point that that particular player is to make.

In the modification, Figure 3, the device includes a disc 9′ upon which rests a pair of dice 11′, it being of course apparent that when the device wobbles these dice will have a rolling movement upon said disc 9′ for thereby bringing into view the different numbers upon the sides of said dice.

In view of the above, it will at once be seen that I have provided a highly novel and simplified form of chance device wherein the well known game of dice may be played and even though I have as herein set forth the most practical embodiment of the invention with which I am at the present time familiar, it is nevertheless to be understood that other modifications may be had as well as minor changes in the construction of the device without departing from the spirit and scope of the appended claims.

What I claim is:—

1. In a rockable game piece of the character set forth, a hollow and transparent member weighted at its lower end whereby said member normally assumes an upright position, said member being divided into upper and lower sections; a plate supported between said sections; and a game piece movable on said plate.

2. In a rockable game piece of the character set forth, a hollow and transparent member weighted at its lower end whereby said member normally assumes an upright position, said member being divided into upper and lower sections; a plate supported between said sections; and a game piece movable on said plate, said plate having projections formed thereon adapted to influence the movement of the game piece during its travel over said surface when the game piece is rocked.

Signed at Johnstown, Penna., this 24th day of September, 1924.

JOHN W. CULP.